United States Patent [19]
Baker

[11] 4,429,903
[45] Feb. 7, 1984

[54] PIPE COUPLING DEVICE FOR RECEIVING REMOVABLY INSERTABLE VALVE

[76] Inventor: Marvin E. Baker, 815 Ewing Ave., Nashville, Tenn. 37203

[21] Appl. No.: 287,764

[22] Filed: Jul. 29, 1981

[51] Int. Cl.³ .............................................. F16L 35/00
[52] U.S. Cl. ........................................ 285/24; 285/31; 285/330; 285/368; 285/423
[58] Field of Search .................. 285/31, 328, 24, 368, 285/412, 423, 330; 138/94, 103, 100, 178; 251/5, 148

[56] References Cited

U.S. PATENT DOCUMENTS

| | | | |
|---|---|---|---|
| 1,632,206 | 6/1927 | Tolman | 285/31 X |
| 2,740,423 | 4/1956 | Stillwagon | 285/363 X |
| 2,994,342 | 8/1961 | Stillwagon | 285/325 X |
| 3,371,677 | 3/1968 | Connolly | 251/5 X |
| 3,409,268 | 11/1968 | Gachot | 251/148 |
| 3,442,288 | 5/1969 | Scaramucci | 285/31 X |
| 3,516,688 | 6/1970 | Gachot | 285/31 |
| 3,603,617 | 9/1971 | Lochridge | 285/31 X |
| 3,643,983 | 2/1972 | Ludeman | 285/31 |
| 3,672,632 | 6/1972 | Chow | 285/31 X |
| 3,830,527 | 8/1974 | Naifeh | 285/31 |
| 3,875,969 | 4/1975 | Sgouraker | 285/31 X |
| 4,073,402 | 2/1978 | Wood | 285/31 X |

FOREIGN PATENT DOCUMENTS 1774317 7/1971 Fed. Rep. of Germany .
1775317 8/1971 Fed. Rep. of Germany .

*Primary Examiner*—Dave W. Arola
*Attorney, Agent, or Firm*—Harrington A. Lackey

[57] ABSTRACT

A pipe coupling device particularly adapted for receiving and holding in sealing engagement with a pair of opposed ends of first and second pipe sections, a coupling element or valve member also having opposed end portions. The coupling device includes a pair of opposed sets of valve holders, each set including a pipe flange connectable to the end of a corresponding adjacent pipe section, inner valve guide members for slidably receiving the opposite end portion of the valve member, and an annular gasket between each of the sets of end flange members and guide members. The two sets of valve holders are secured together by a pair of transversely spaced upper tie rods and a lower tie rod to permit the free insertion of the valve member between the upper tie rod and into operative position within the respective guide members. The two sets of holders are axially movable toward and away from the valve member in operative position to permit insertion and removal of the valve member, and are held in tight sealing engagement with the ends of the valve member by means of nuts threaded on the tie rods, and against the respective valve holders.

5 Claims, 4 Drawing Figures

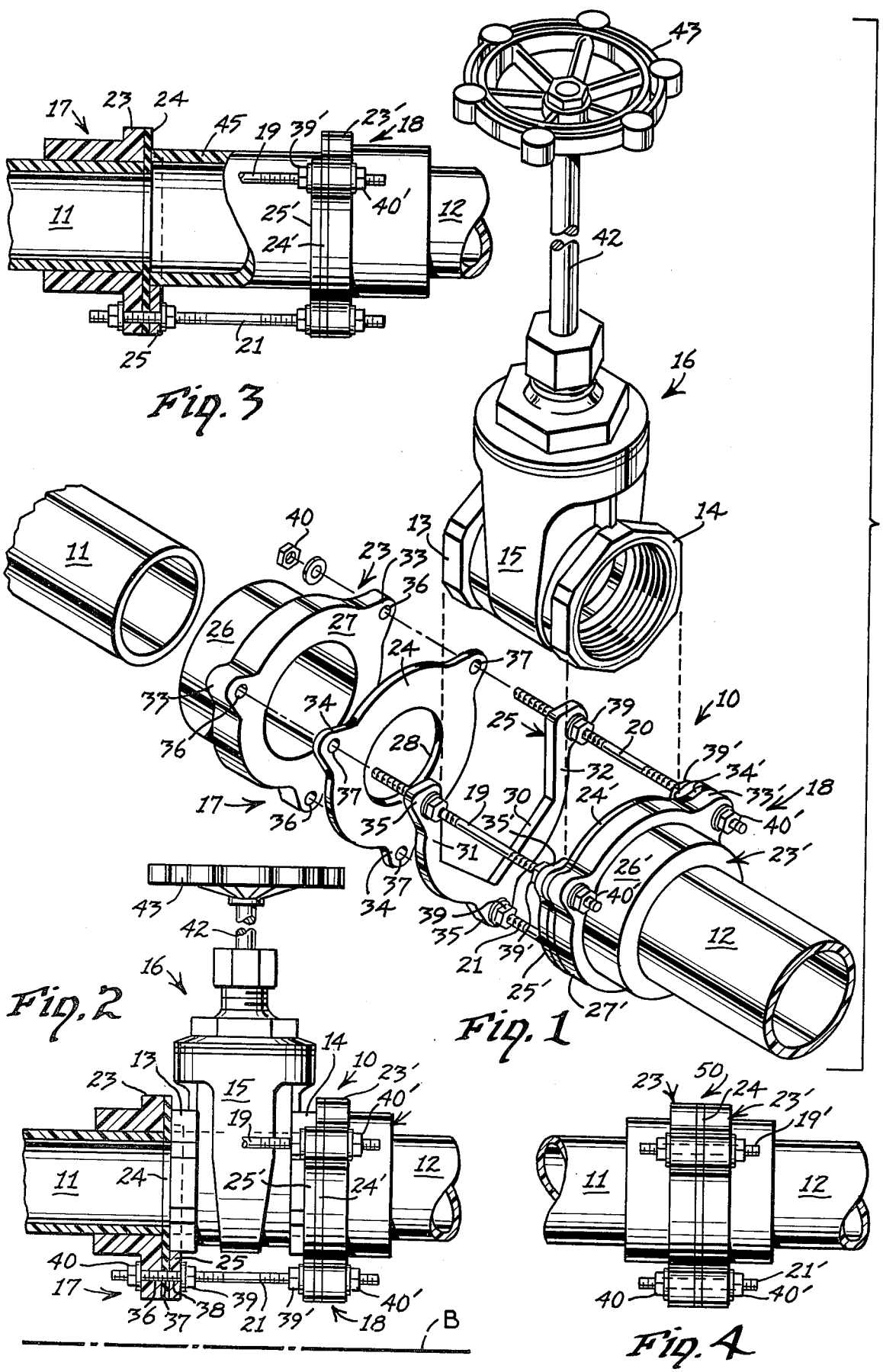

PIPE COUPLING DEVICE FOR RECEIVING REMOVABLY INSERTABLE VALVE

BACKGROUND OF THE INVENTION

This invention relates to pipe couplings, and more particularly to a pipe coupling for receiving a removably insertable valve fitting.

Pipe coupling devices, including coupling elements of various types held between a pair of opposed flanges on adjacent ends of pipe sections and secured by tie rods and nuts, are old in the art, as illustrated in the following U.S. Pat. Nos.:

| 2,740,423 | Stillwagon | Apr. 3, 1956 |
| 2,994,342 | Stillwagon | Aug. 1, 1961 |
| 3,371,677 | Connolly | Mar. 5, 1968 |
| 3,409,268 | Gachot | Nov. 5, 1968 |
| 3,442,228 | Scaramucci | May 6, 1969 |
| 3,516,688 | Gachot | June 23, 1970 |
| 3,603,617 | Lochridge | Sept. 7, 1971 |
| 3,643,983 | Ludeman | Feb. 22, 1972 |
| 3,672,632 | Chow | June 27, 1972 |
| 3,830,527 | Naifeh et al | Aug. 20, 1974 |
| 4,073,402 | Wood | Feb. 14, 1978 |
| 1,775,317 | German | July 27, 1968 |

Many of these patents, such as the Gachot patents, also include annular gaskets fitted in sealing engagement between the flanges and the respective coupling elements.

The Connolly U.S. Pat. No. 3,371,677 and the Chow U.S. Pat. No. 3,672,632, disclose tie rods having inner and outer nuts located inside and outside the respective flanges.

Both of the Gachot U.S. Pat. Nos. 3,409,268 and 3,516,688 disclose coupling devices in which the upper tie rods are spaced apart a distance greater than the diameter of the valve body or insertable coupling element.

However, none of the above patents disclose a coupling device having flanged end holders including guide members for receiving the opposite end portions of a valve fitting in order to orient the angular position of the valve fitting in its operative position between the pipe sections, much less the especially designed U-shaped guide members made in accordance with this invention.

SUMMARY OF THE INVENTION

It is therefore an object of this invention to provide a pipe coupling device particularly adapted for quickly inserting or removing a coupling element or valve fitting between a pair of opposed spaced pipe sections, for holding the valve fitting in an operative position sealed between the adjacent pipe sections, and for guiding and holding the pipe fitting in an upright position.

The pipe coupling device made in accordance with this invention is particularly adapted for receiving a valve fitting in sealing relationship between a pair of opposed pipe sections, in a location which has limited accessibility for maintaining the valve fitting or coupling element. One example of such a valve fitting would be a long stem gate valve adapted to be connected between a pair of pipe sections which are underground. The pipe coupling device made in accordance with this invention permits such a valve fitting to be easily inserted between the pipe sections, drawn into sealing engagement with the pipe sections, and removed from the pipe sections, with a minimum of effort, tools and time.

More particularly, the coupling device made in accordance with this invention includes a pair of opposed valve fitting holders, each holder including an end flange for attachment to its corresponding pipe section, a U-shaped guide member, and a gasket sandwiched between the guide member and the end flange. Both holders are mounted in spaced apart relationship and adjustably movable axially toward and away from each other for receiving the body of the valve fitting in its proper angular position, and for quickly drawing the pipe sections and end flanges in sealing engagement against the opposite ends of the valve body. The holders are mounted upon elongated threaded tie rods which support axially traveling interior and exterior nuts for holding the respective end flanges, gaskets and guide members together, and for moving these holders axially toward and away from the valve body.

The U-shaped guide members are provided with a bottom edge and a pair of upright arms, open at the top for receiving the respective end portions of a valve body and for guiding these end portions down within the guide members until they are seated within a relatively upright position in coaxial alignment with the pipe sections. For a valve fitting having opposite hexagonal-shaped flow passage end openings, each guide member has its ledges and arms shaped to the same configuration as at least the lower portion of the hexagonal end portion so that these end portions fit perfectly within the respective guide members, not only for truly aligning the end openings with the respective pipe sections, but also for preventing the valve body from rotating out of its proper angular position.

The pipe coupling device made in accordance with this invention is also adapted for receiving other types of coupling elements, such as a replaceable pipe insert for splicing pipe sections together.

BRIEF DESCRIPTION OF THE DRAWINGS

FIG. 1 is an exploded perspective view of the assembly of the pipe coupling device for joining the ends of the two pipe sections, with the valve fitting elevated in an operative position, but preparatory to insertion within the coupling device;

FIG. 2 is a side elevation of the device disclosed in FIG. 1, with the valve fitting in operative position, with the two aligned pipe sections shown fragmentarily, and with the left pipe section, end flange member and gasket shown in section;

FIG. 3 is a side elevation of the coupling device with a modified coupling element in operative position, and with portions shown in section, for clarity; and FIG. 4 is a side elevation of a modified form of pipe coupling device utilized as a pipe union.

DESCRIPTION OF THE PREFERRED EMBODIMENTS

Referring now to the drawings in more detail, FIGS. 1 and 2 disclose a pipe coupling device 10 made in accordance with this invention, particularly adapted for connecting the opposed end portions of two pipe sections 11 and 12 in sealing relationship with the opposite end portions 13 and 14 of a valve body 15 of a valve fitting 16, specifically disclosed as a gate valve.

The coupling device 10 includes a pair of opposed valve holders 17 and 18, each having identical, mirrorimage components or elements, and secured together in axial alignment for axial adjustment by a pair of upper tie rods 19 and 20 and a lower tie rod 21.

The holder 17 includes a first or left end flange member 23, an annular gasket 24, and a guide member 25.

The particular end flange member 23 disclosed in the drawings is an integral piece including a cylindrical boss or collar 26 adapted to be connected to the end of the pipe section 11, either mechanically, such as by threading, and/or by a suitable adhesive. The interior diameter of the end flange member 23 is approximately equal to the outer diameter of the pipe section 11, so that the collar 26 may tightly slip-fit over the pipe section 11, where it is secured preferably by gluing in a sealed relationship. The inner end of the end flange member 23 constitutes an enlarged annular flange 27 having a planar inner surface to fit flush against the outer surface of the gasket 24. The gasket 24 is provided with a central hole or opening 28 which is of substantially the same diameter as the inner diameter of the pipe section 11 to permit the free flow of a liquid through the pipe section 11, end flange member 23 and gasket 24.

The guide member 25 is of a U-shape, or wish-bone shape, including a bottom ledge, such as the V-shaped bottom ledge 30 and a pair of upstanding, preferably vertical, legs 31 and 32 having substantially vertical inner surfaces. The guide member 25 is completely open at the top.

The particular configuration of the ledge 30 and the side arms 31 and 32 is dictated by the shape of the end portion 13 of the valve body 15. As disclosed in the drawings, the end portion 13, as well as the end portion 14, generally have regular hexagonal shapes, with the opposite side edges being substantially vertical when the valve fitting 16 is oriented in its upright vertical position. Thus, the bottom two edges of the hexagonal-shaped left end portion 13 is V-shaped. Accordingly, the arms 31 and 32 have true vertical interior surfaces for engaging the opposite vertical side edges of the hexagonal-shaped left end portion of the valve body 15. The bottom ledge 30 is V-shaped having an interior angle equal to the interior angle of a regular hexagon, namely 120°. Thus, the interior surfaces of the arms 31 and 32 and the bottom ledge 30 are shaped to receive and support the end portion 13 in slidable but non-rotatable movement and positioning.

In a preferred construction, ears 33, 34 and 35 project radially from the respective flange 27, gasket 24, and guide member 25, and are spaced circumferentially equidistant. Two of the three ears in each set are transversely spaced in the uppermost portion of the respective components 27, 24 and 25, while the third ear depends centrally from the lower portion of the respective components 27, 24, and 25.

In each of the ears 33, 34, and 35 is a rod hole 36, 37 and 38, respectively, so that corresponding sets of rod holes are longitudinally or axially aligned for receiving the respective tie rods 19, 20 and 21 for free axial movement, to permit axial adjustment of the components 23, 24 and 25.

Since the valve holder 18 includes an end flange member 23', including collar 26' and flange 27', an annular gasket 24' and a guide member 25', of identical construction to their counterparts 23, 24 and 25, these identical elements will have the same reference numerals primed and no further description of their detailed construction will be necessary.

Moreover, the other or right ends of the tie rods 19, 20 and 21 extend through aligned corresponding rod holes, not shown, in the radially projecting ears 33', 34', and 35' of the corresponding elements in the valve holder 18.

In order to hold the valve holders 17 and 18 in their respective adjusted positions on the tie rods 19, 20 and 21, securing elements, such as the pairs of interior adjustable spreader elements or nuts 39 and 39' preferably threadedly engage the respective threaded tie rods for axial travel between the guide members 25 and 25'. Moreover, axially adjustable exterior or end securing elements or nuts 40 are preferably threadedly secured to the remote ends of the respective threaded tie rods 19, 20 and 21, outside the ears 33 and 33' of the flange members 23 and 23'.

The coupling device 10 is particularly useful in installing any type of coupling element, such as a valve fitting 16, into a fluid line, such as between axially spaced pipe sections 11 and 12, in a remote or relatively inaccessible location.

In one example of a typical inaccessible location, plastic pipe sections 11 and 12 are buried in the ground with a separation of approximately three inches, and a hole extends from the surface of the ground downward between the pipe sections 11 and 12 to the bottom B of the hole. A valve fitting 16 having a long valve stem 42 with a rotary valve wheel 43 may be lowered into the hole and easily inserted between the pipe sections 11 and 12 by utilizing the coupling device 10.

To assemble the coupling device 10, the spreader nuts 39 and 39' are first threaded upon their respective tie rods 19, 20 and 21 and moved centrally toward each other, leaving sufficient space on the outer ends of the respective tie rods for receiving the components of the holders 23 and 23'. Each of the guide members 25 and 25' are slipped over the ends of the respective tie rods 19, 20 and 21 and moved toward the center against the respective spreader nuts 39 and 39'. Then, the respective gaskets 24 and 24' are slipped over the respective tie rods 19, 20 and 21, and lastly the end flange members 23 and 23' are slipped over the ends of the respective tie rods, until the gaskets 24 and 24' are sandwiched between the respective end flange members 23 and 23' and the guide members 25 and 25'. The end nuts 40 are then fitted over the outer ends of the threaded tie rods 19, 20 and 21 to loosely hold the respective components of the holders 17 and 18 upon the tie rods 19–21.

The spreader nuts 39 and 39' are adjusted until the distance between the gaskets 24 and 24' is slightly greater than the length of the valve body 15, that is the axial distance between the outer ends of the end portions 13 and 14, so that the valve body 15, when lowered into the hole, may pass between the upper tie rods 19 and 20, and its end portions 13 and 14 descend into the guide members 25 and 25'.

Then the collars 26 and 26' are secured to the opposing ends of the pipe sections 11 and 12. For example, if these component parts are made of plastic, the collar 26 is preferably adhesively secured by a conventional glue or adhesive to the exterior surface of the pipe section 11, while the collar 26' is likewise secured to the exterior surface of the pipe section 12.

Before the glue has set, the valve fitting 16 is lowered through the vertical hole in the ground and down between the spaced gaskets 24 and 24', with the hexagonal end portions 13 and 14 lowered and slip-fitted between the side arms 31 and 32 of the respective guide members 25 and 25' until the bottom edges of the end portions 13 and 14 seat securely upon the V-shaped ledges 30 of the respective guide members 25 and 25'.

The spreader nuts 39 and 39' are then adjusted inward toward each other along their respective tie rods 19–21 until the respective gaskets 24 and 24' may be moved inward tight against the end faces of the end portions 13 and 14 of the valve body 15. Then, all of the end nuts 40 are tightened against the ears 33 and 33' to force the flanges 27 and 27' flush against the outer surfaces of the gaskets 24 and 24', simultaneously urging these gaskets tight against the end faces of the end portions 13 and 14. The collars 26 and 26' will simultaneously draw inward the pipe sections 11 and 12, or the collars will slip inward along the pipe sections 11 and 12 forcing the unset glue to yield slightly.

After the end flange members 23 and 23' and the gaskets 24 and 24' have been sealed tightly against the end portions 13 and 14, the spreader nuts 39 and 39' are reversed to travel outward until they abut flush against the respective ears 35 and 35' of the guide members 25 and 25'. The assembly of valve fitting 16 between the pipe sections 11 and 12 is then complete.

If, for some reason, the valve fitting 16 malfunctions or wears out, it may be easily removed and replaced by merely reversing the above procedure for inserting the valve fitting 16 in the coupling device 10. The end nuts 40 are unthreaded to move outward on the respective tie rods 19–21 to loosen the respective components of the holders 17 and 18. The spreader nuts 39 and 39' are also moved slightly outward to force the respective holders 17 and 18 away from engagement with the end portions 13 and 14 of the valve body 15. The valve fitting 16 is then completely free to be vertically lifted from between the pipe sections 11 and 12. A replacement valve fitting 16 is installed and the assembly procedure is repeated.

In order to insert or remove a valve fitting 16 between the pipe sections 11 and 12, all that is needed is a coupling device 10 and small wrenches or nut drivers for turning the spreader nuts 39 and 39' and the end nuts 40, and a suitable adhesive for securing the collars 26 and 26' to the respective pipe sections 11 and 12.

Utilization of the coupling device 10 eliminates conventional threaded pipe coupling devices and conventional 18-inch and 24-inch pipe wrenches, as well as considerable time and effort in operating such conventional parts and tools in crowded spaces. The rotation of cooperating threaded elements with conventional tools in such crowded spaces may be time-consuming, if not virtually impossible, without substantial enlargement of the hole or working space.

FIG. 3 discloses the same pipe coupling device 10 and the installation of another type of coupling element than a valve fitting 16, such as a small cylindrical pipe coupling section 45, which is utilized to connect the opposed pipe sections 11 and 12. In this assembly, normally a long single underground pipe may be defective, such as being ruptured or broken, in which event the defective section is cut out and replaced by the coupling pipe section 45. The procedure for utilizing the coupling device 10 for installing the cylindrical pipe coupling section 45 is identical to that for installing the valve fitting 16, except the configuration of the interior guide surfaces, such as the ledge 30 and the vertical arms 31 and 32, is not critical, because the angular orientation of the pipe coupling element 45 is not important. Of course, the transverse spacing of the vertical arms 31 and 32 of the guide members 25 and 25' is of substantial assistance in guiding the cylindrical pipe section 45 downward into coaxial relationship with the pipe sections 11 and 12, even though the angular orientation is not important.

FIG. 4 illustrates the utilization of the two end flange members 23 and 23' and a single gasket 24 mounted on three tie rods 19', 20' and 21', to form a pipe union 50 between the pipe sections 11 and 12. Only sufficient clearance between the ends of the pipe sections 11 and 12 is needed for insertion of only one end flange member at a time. The collars 26 and 26' may be glued to the plastic pipe sections 11 and 12 and the exterior nuts 40 and 40' threaded to force the end flanges 23 and 23' toward each other to squeeze the gasket 24 between the end flanges to effect a tight seal. In this utilization of some of the components of the holders 17 and 18, it will be noted that none of the guide members 25 or 25', nor the second gasket 24', nor any of the spreader nuts 39 or 39', are needed.

It will be understood that where a valve fitting similar to the valve fitting 16 is installed with a coupling device 10, and the pipe fitting has annular end portions 13 and 14, having square or other non-circular shaped cross-sections, the interior surfaces of the side arms 31 and 32 as well as the bottom ledge 30 will be shaped accordingly for receiving in snug fitting engagement the respective shaped end portions of the valve body.

What is claimed is:

1. A coupling device for connecting a coupling element having opposite end portions with aligned end openings, between opposed ends of coaxially spaced first and second pipe sections, comprising:
  (a) a first end flange member connectable to a first pipe section having a longitudinal axis, said first end flange member having a central opening therethrough coaxial with the first pipe section,
  (b) a first annular gasket having an outer surface adapted to fit flush in sealing engagement against said first end flange member, and an inner surface, and having a central opening therethrough coaxial with the central opening of said first end flange member,
  (c) a first guide member adapted to fit against said inner surface of said first annular gasket, said first guide member being generally U-shaped having a transversely extending bottom ledge and a pair of upright arms projecting upward from said bottom ledge and transversely spaced apart for receiving an end portion of a coupling element so that the corresponding end opening of the coupling element is coaxial with the central opening of said first end flange member,
  (d) a second end flange member connectable to a second pipe section having a longitudinal axis, said second end flange member having a central opening therethrough coaxial with the second pipe section,
  (e) a second annular gasket having an outer surface adapted to fit flush in sealing engagement against said second end flange member, and an inner surface, and having a central opening therethrough coaxial with the central opening of said second end flange member,
  (f) a second guide member adapted to fit against said inner surface of said second annular gasket, said second guide member being generally U-shaped having a transversely extending bottom ledge and a pair of upright arms projecting upward from said bottom ledge and transversely spaced apart for receiving the other opposite end portion of a coupling element so that the corresponding end opening of the coupling element is coaxial with the central opening of said second end flange member, (g) a plurality of elongated tie rods, (h) means mounting said end flange members, said gaskets and said guide members on said tie rods for longitudinal axial movement, said end flange members being outermost and said guide members being innermost, (i) said end flange members, gaskets, and guide members being axially adjustable on said tie rods to receive the opposite end portions of the coupling element in the respective first and second guide members, seated upon the respective ledges, located between the opposed arms, and sealed between said gaskets in operative position, and (j) a pair of end securing elements on each end of each tie rod adjustably movable axially of said tie rods for urging said end flanges toward each other thereby compressing said gaskets into sealing engagement with said end flanges and the opposing ends of the coupling element and for locating said guide members in the desired position.

2. The invention according to claim 1 in which each opposite end portion of the coupling element adjacent a respective end opening has an annular, non-circular configuration, the ledges and arms of each respective guide member having the same configuration, and being of substantially the same size, as the corresponding opposite end portion for receiving the respective end portion in a predetermined angular orientation, in said operative position.

3. The invention according to claim 2 in which the annular configuration of each of the end portions is hexagonal, and the corresponding configuration of the arms and ledge of each respective guide member is the same as the lower portion of the hexagonal end portion, for snugly receiving said coupling element in an upright attitude in its operative position.

4. The invention according to claim 1 in which said means mounting said end flange members, gaskets, and guide members on said tie rods comprises radially outward projecting ears, said ears having axially alinged rod holes for axially receiving said tie rods.

5. The invention according to claim 4 in which said tie rods comprise first and second upper tie rods spaced apart transversely greater than the corresponding dimension of the coupling element passing therethrough to its operative position, and a third tie rod below the coupling element in operative position.

* * * * *